(12) United States Patent
Dwyer et al.

(10) Patent No.: US 6,653,947 B2
(45) Date of Patent: Nov. 25, 2003

(54) APPARATUS FOR THE DISPLAY OF WEATHER AND TERRAIN INFORMATION ON A SINGLE DISPLAY

(75) Inventors: David B. Dwyer, Scottsdale, AZ (US); Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/081,601

(22) Filed: Feb. 20, 2002

(65) Prior Publication Data

US 2003/0156046 A1 Aug. 21, 2003

(51) Int. Cl.[7] ............................................... G08B 23/00
(52) U.S. Cl. ....................... 340/970; 340/961; 340/968; 342/26; 701/14
(58) Field of Search ................................ 340/961, 968, 340/970, 949, 963; 701/4, 9, 14; 342/26, 65

(56) References Cited

U.S. PATENT DOCUMENTS

| | | | | |
|---|---|---|---|---|
| 4,940,987 A | * | 7/1990 | Frederick | 342/26 |
| 5,202,690 A | * | 4/1993 | Frederick | 342/26 |
| 5,838,262 A | * | 11/1998 | Kershner et al. | 340/965 |
| 5,920,276 A | * | 7/1999 | Frederick | 342/26 |
| 5,936,552 A | * | 8/1999 | Wichgers et al. | 340/963 |
| 5,995,903 A | * | 11/1999 | Smith et al. | 701/211 |
| 6,489,916 B2 | * | 12/2002 | Block | 342/65 |
| 6,496,760 B1 | * | 12/2002 | Michaelson et al. | 701/3 |

* cited by examiner

Primary Examiner—Brent A. Swarthout

(57) ABSTRACT

A display system having a display screen for graphical display of data, a graphics processor for receiving data from at least a terrain data base and data from a weather radar and for converting the received data into a single data stream to provide an input data stream to the display screen. The single display displays the weather data on one portion of the display screen and displays the terrain data on a second portion of the display screen. The weather data is displayed as a two-dimensional graphic and the terrain data is displayed as a three-dimensional graphic, thus providing a user with the necessary flight information while keeping processing resources to a reasonable level. The terrain data is displayed as an out the window display graphic, and the weather data and the terrain data displays are scaled such that the displays are dimensionally juxtaposed to allow rapid recognition of the data by a user of the display system.

20 Claims, 2 Drawing Sheets

APPARATUS FOR THE DISPLAY OF WEATHER AND TERRAIN INFORMATION ON A SINGLE DISPLAY

TECHNICAL FIELD

The present invention relates to a display for a vehicle, and more particularly to a method and apparatus for displaying both weather and terrain information on a single display.

BACKGROUND OF THE INVENTION

Modern map displays, particularly those used in aircraft for flight planning and monitoring, are capable of displaying a considerable amount of information such as weather information and terrain information. The terrain information consists of situational awareness (SA) terrain and terrain cautions and warnings which, among other things, may indicate where the aircraft may potentially impact terrain. The weather information consists of airborne weather information from onboard weather radar or weather information received from, for example, ground based or satellite weather sources. In present display systems, the pilot or crewmember (user) selects which information (terrain or weather) he wishes to view.

Previous attempts at integrating weather and terrain information into a single display window in a lateral format suffered from ambiguity as both terrain and weather radar information exhibit similar two-dimensional display features. Three dimensional volumetric weather data representation presents significant ambiguity in storm cell location, size, and internal threat levels. The planned avoidance path using three-dimensional view data is less efficient than using the lateral display information.

Furthermore, displaying weather data in three-dimensional form requires a great deal of processing of the data, making real-time displays difficult to produce in an aircraft cockpit environment.

BRIEF SUMMARY OF THE INVENTION

The present invention addresses the problem of mutual exclusivity of weather and terrain data types. The weather, from a pilot's point of view is really a two-dimensional problem. That is, commercial pilots go around weather and do not attempt to fly over or under significant weather, therefore it is reasonable to display weather on a lateral map, that is from a perspective of weather areas rather than three-dimensional representations of the weather. Terrain, on the other hand is a three-dimensional problem since height must be considered by the pilot in order to stay above the terrain. Out-the-window view terrain displays allow faster terrain threat identification and allow optimal avoidance maneuvers in comparison to two-dimensional lateral or vertical profile displays.

These and other problems are addressed by providing a display system having a display screen for graphical display of data, a graphics processor for receiving data from at least a terrain data base and data from a weather radar and for converting the received data into a single data stream to provide an input data stream to the display screen. The single display displays the weather data on one portion of the display screen and displays the terrain data on a second portion of the display screen. The weather data is displayed as a two-dimensional graphic and the terrain data is displayed as a three-dimensional graphic, thus providing a user with the necessary flight information while keeping processing resources to a reasonable level. The terrain data is displayed as an out the window display graphic, and the weather data and the terrain data displays are scaled such that the displays are dimensionally juxtaposed to allow rapid recognition of the data by a user of the display system.

BRIEF DESCRIPTION OF THE DRAWINGS

The present invention will hereinafter be described in conjunction with the appended drawing figures, wherein like numerals denote like elements, and in which.

DETAILED DESCRIPTION OF THE DRAWINGS

Figure 1:
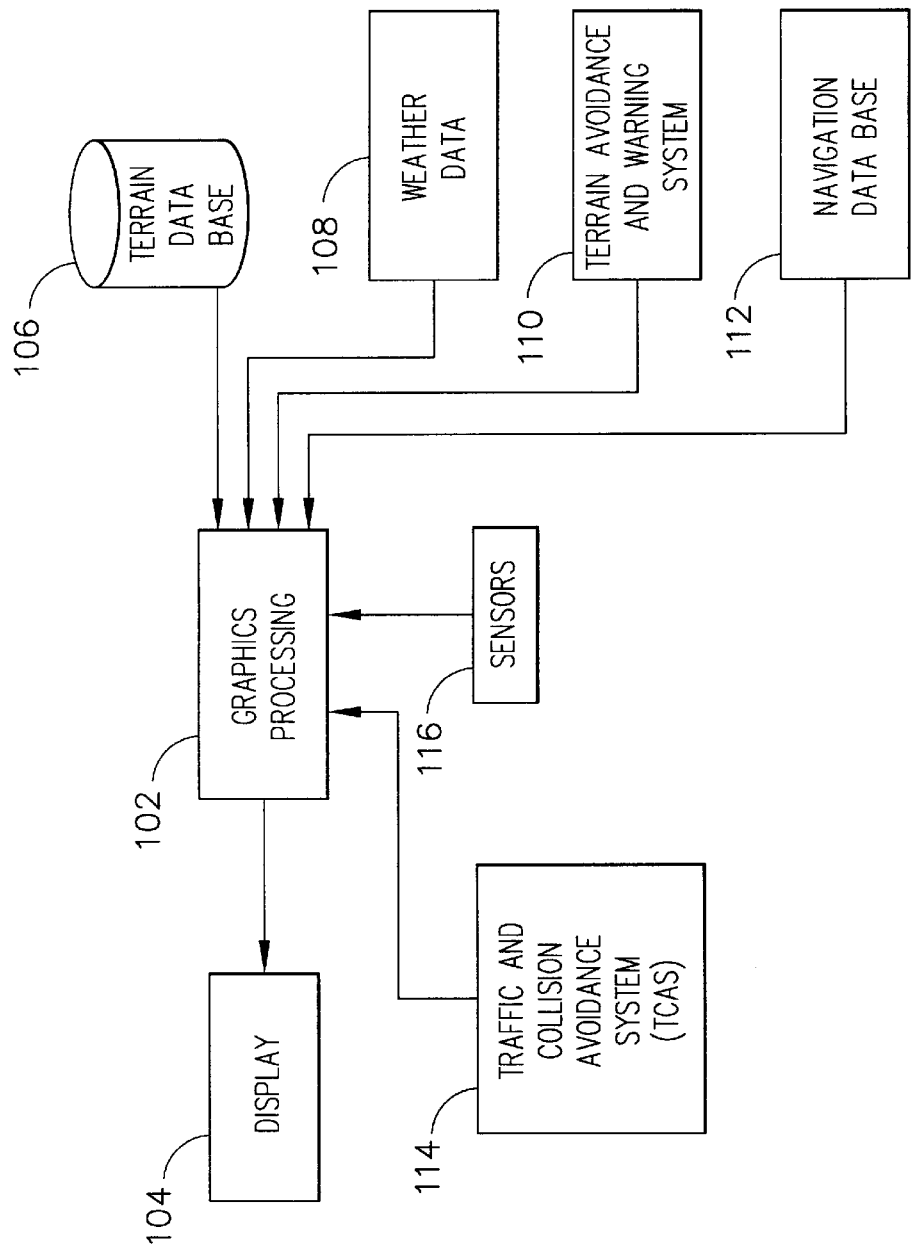
FIG. 1 is a block diagram of a display system usable with the instant invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

In FIG. 1, an exemplary display system 100 includes a graphics processor 102 configured to provide information to a display element or monitor 104. One or more data sources are coupled to the processor 102. These data sources may be, but are not limited to a terrain data base 106, weather radar data source 108 from and on-board weather radar unit or from an external weather data source such as a ground-based weather data source or a satellite weather data source, a terrain avoidance and warning system (TAWS) 110, a navigation data base 112, a traffic and collision avoidance system (TCAS) 114 or other sensors 116 which may provide additional useful information to a user.

A number of aspects of display element 104 (which are controlled by processor 102 in a practical embodiment) may contribute to the improved contents and appearance of the display, thus increasing the situational and weather awareness of the pilot and/or flight crew. The image generation and display aspects may leverage known techniques such that existing display systems can be modified in a straightforward manner to support the different features described herein. In a practical implementation, the concepts described herein may be realized in the form of revised display generation software or processing resident at processor 102.

Processor 102 encompasses one more functional blocks used to provide a flight management, navigational, weather and positional interface with the pilot, and input to display element 104. Processor 102 may include or cooperate with a mode, position and/or detection element that is capable of determining the mode or position of the vehicle relative to one or more reference locations, points, planes, or navigation aids. In addition, processor 102 may be configured to receive, analyze, condition, and process navigation and positional information as well as weather information associated with the vehicle. In this regard, processor 102 may include any number of individual microprocessors, flight computers, navigation equipment, memories, storage devices, interface cards, and other standard components known in the art. Moreover, processor 102 may include any number of microprocessor elements, memory elements, power supplies, and other functional components as necessary to support the operation of the display system 100. In this respect, processor 102 may include or cooperate with any number of software programs or instructions designed to carry out various methods, process tasks, calculations, control functions, and the generation of display signals and other data used by display element or monitor 104. For example, processor 102 may be configured to generate an annunciator associated with the position of the aircraft relative to at least one reference location, to generate windows corresponding to user inputs, to combine inputs from various sensors to create a single data stream for presentation to the display element 104, and the like.

Processor 102 may also be suitable configured to receive and process navigational data 112 related to an intended destination of the aircraft. In a practical commercial aircraft application, such navigational data 112 may be associated with specific waypoints, airports, navigational aids, or the like. As described in more detail below, processor 102 may process data from any of the data inputs shown above and generate appropriate signals to display element 104 such that display element 104 generates indicia representative of the appropriate navigational, weather, terrain, or other information, or the like. Such processors and flight control computers are available from a number of manufacturers such as Honeywell International Inc. In an exemplary embodiment, processor 102 is incorporated within a flight management system (FMS) or another avionics component which, inter alia, formats navigation data and forwards the data to monitor 104 for display as data on display 104.

Display element 104 may include any display element suitable for displaying the various symbols and information detailed below. Many currently known monitors are suitable for this task, including various CRT and flat-panel display systems. Display element 104 may be based on a panel mounted display, a HUD projection, or any known technology. In an exemplary embodiment, display element 104 includes a panel display. Display element 104 suitably includes various graphical elements associated with the environment of the aircraft including the location of various navigational aids including VHF Omnirange stations, non-directional beacons, radio stations, and the like, and airports, airways, special use airspace, and other aircraft.

In operation, the graphics processor 102 obtains inertial data (position, speed, direction) from the sensors 116. Based on the inertial data, the graphics processor 102 obtains terrain data and navigation data from the data bases 106, 112. These data bases are typically onboard the aircraft, but need not be limited to such a design. The graphics processor 102 renders a picture of the absolute terrain, and the navigation data (VORs, airports, airways, etc.) is also rendered on the display element 104. Overlayed on top of this picture is data from the TCAS 114, TAWS 110 and weather 108.

These sensors provide data to the graphics processor 102. For the TCAS 114, this consists of other aircraft located in the vicinity. The TCAS data may consist of, but is not limited to, speed, direction, altitude, and altitude trend. Each aircraft is drawn on the display monitor 104 by the graphics processor 102. The weather sensor 108 provides the location of weather cells to the graphics processor 102. This data consists of the location of precipitation which is shown in various colors on the display based on the water content of the weather cells. The graphics processor 102 renders the location of the cells on the display. The TAWS 110 provides data to the graphics processor 102 regarding the location of terrain that may be a threat to the aircraft. The graphics processor 102 shows the potential threat terrain in various colors depending on the level of threat: red for warnings (immediate danger), yellow for cautions (possible danger), and green for terrain that is not a threat. The weather and TAWS may use the same colors and are mutually exclusive on the lateral map display. Of course, other colors and different numbers of levels of threat can be provided as a matter of choice.

Figure 2:
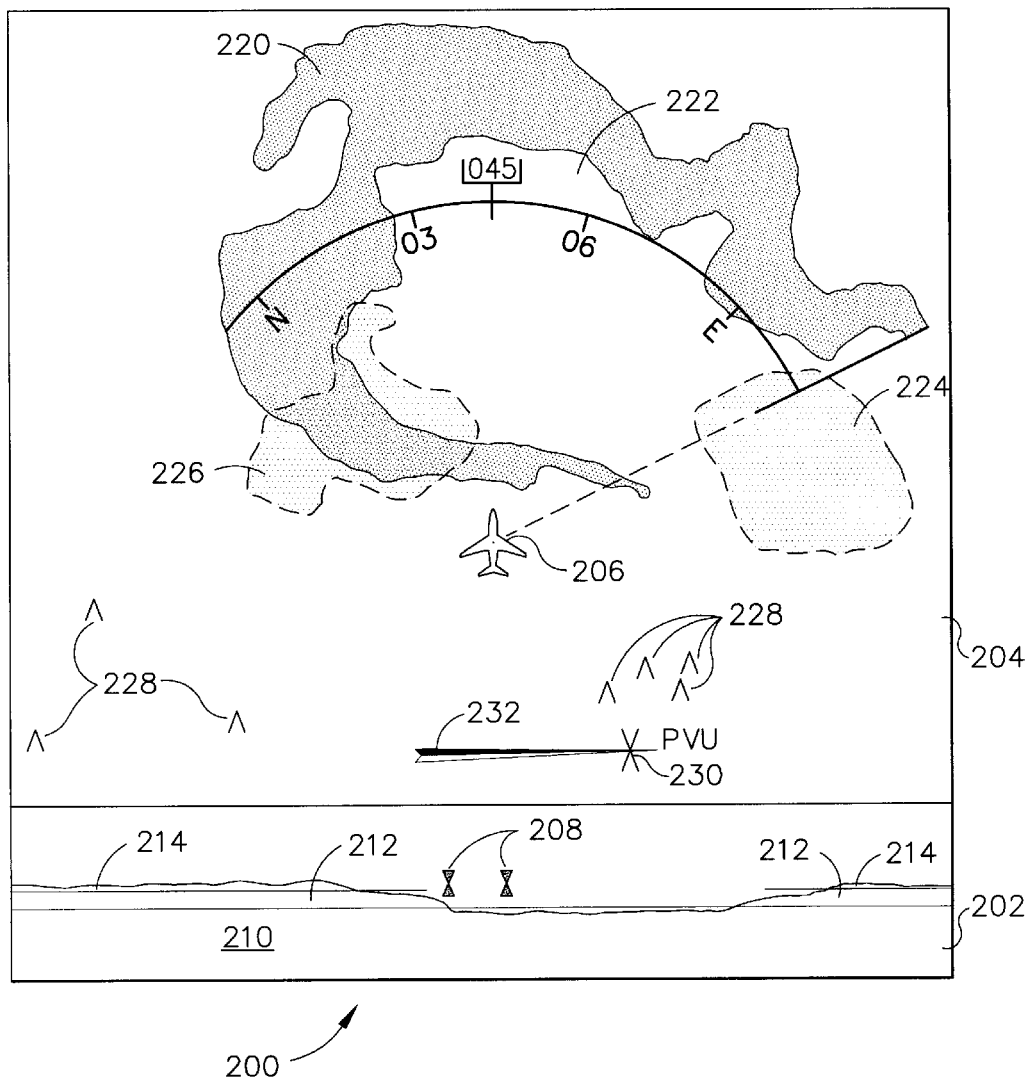
FIG. 2 is a representation of a display showing a preferred display format including both weather and terrain information on a single display.

FIG. 2 is a representation of a display showing a preferred display format including both weather and terrain information on a single display.

A display 200 is shown generally in two parts, a terrain display 202 which is presented as an out-the-window view of the terrain ahead, and a weather portion of the display 204 which shows a lateral two-dimensional view of the weather ahead of the aircraft. The position of the aircraft is represented by an aircraft icon 206, which is horizontally reflected onto the terrain portion of the display by markers 208. Note that the scale of each portion of the display 202 and 204 is the same so that the pilot can easily orient his position to either portion of the display. The markers 208 represent, however, a point a fixed distance in front of the aircraft (for example two miles) to help provide depth to the viewer so the viewer can sense how far away the terrain is located.

Additionally in the terrain portion of the display, the terrain is divided into areas representing the heights of various areas of terrain with respect to the altitude of the aircraft. In the display shown, an area 210 is identified as an area well below the present altitude of the aircraft. (In usual conventions this would be shown on a color display as a green area). Areas 212 would conventionally be shown as a yellow colored area and represents a terrain elevation of perhaps two thousand feet below the altitude of the aircraft and up to the present altitude of the aircraft. Areas 214, on the other hand, represent terrain from the altitude of the aircraft and higher and, naturally, represent the greatest threat and so are typically represented by a red color. The elevations noted above, of course, as is the color pattern, arbitrary, and the display can be configured in any form convenient to the user.

In the weather portion of the display 204 is shown an aircraft icon 206 representing the present position of the aircraft. An area of weather which may comprise a storm cell is shown at 220 which is bounded by a solid line. Another portion of the storm cell 222 is shown, also bounded by a solid line, and which may represent the most severe portion of the storm cell. As in the color conventions previously mentioned with respect to the terrain section of the display, these areas are typically color coded to facilitate rapid identification of a threat. Thus the storm cell area 220 may be colored yellow and the more severs storm cell threat 222 may be colored red on a color display. Again, while the coloring notation is conventional, it in no way limits the application of the instant invention to other color or configuration schemes.

Also shown in FIG. 2, and particularly weather display section 204 are two areas 224 and 226 (bounded by dashed lines) which may optionally be displayed and which represent terrain features which are reflected from the terrain display portion 202 of the display 200. These areas on this portion 204 of the display, however, will not show the color coding as used in the lower (terrain) portion 202 of the display, since the weather is primary in this portion 204 of the display and the weather is normally shown color-coded as to precipitation intensity. The terrain areas 224, 226 may be displayed for convenience of reference, but are not necessary to the instant invention. Alternately, such areas could be depicted in a largely transparent mode so that merely a light shadow of the terrain is shown in the weather portion 204 of the display 200. The terrain can also be removed by the user if desired.

Additionally, for convenience of reference other features may be shown such as towers or terrain peaks 228 and an airport 230 with its associated glideslope representation 232.

While the invention has been described in terms related to the preferred embodiment disclosed herein, it will become apparent to those skilled in the art that modifications may be made which however remain within the scope of the appended claims.

What is claimed is:

1. A flight deck display system comprising:
   a display having a display screen for graphical display of data,
   a graphics processor for receiving terrain data from at least a terrain data base and weather data from a weather data source and for converting the received data into a single data stream to provide an input data stream to the display screen, the display screen having two display areas, a lateral two-dimensional display area and a three dimensional display area,
   the display displaying the weather data only on the lateral two dimensional area of the display screen and displaying the terrain data at least on the three dimensional area of the display screen, thus contributing to the clarity and ease of interpretation of the display;
   the weather data being displayed most efficiently solely as a two-dimensional graphic and the terrain data being displayed as a three dimensional graphic.

2. A flight deck display system as set forth in claim 1 wherein the terrain data is displayed as an out the window display graphic.

3. A flight deck display system as set forth in claim 1 wherein the terrain data is displayed relative to the altitude of an aircraft.

4. A flight deck display system as set forth in claim 2 wherein the terrain data is displayed relative to the altitude of an aircraft.

5. A flight deck display system as set forth in claim 1 wherein the weather data and the terrain data represented on the display are scaled such that the displays of the data are dimensionally juxtaposed to allow rapid recognition of the data by a user of the display system.

6. A flight deck display system as set forth in claim 5 wherein the terrain data is displayed as an out the window display graphic.

7. A flight deck display system in an aircraft comprising:
   a display having a display screen for graphical display of data,
   a terrain data base,
   a weather sensor,
   a source for providing data representing the position, heading and velocity of the aircraft, and
   a source of terrain avoidance warning data;
   a graphics processor for receiving terrain data from the terrain data base, weather data from the weather sensor, position, heading, and velocity data from the source of position, heading and velocity data, and terrain avoidance warning data from the source of terrain avoidance warning data, and for converting the received data into a data stream to provide an input data stream to the display screen,
   the display simultaneously displaying the data on the display screen such that the weather data is displayed solely as a two-dimensional graphic, thus contributing to the clarity and ease of interpretation of the display, and the terrain data is displayed primarily as a three dimensional graphic.

8. A flight deck display system as set forth in claim 7 wherein the terrain data is displayed as an out the window display graphic.

9. A flight deck display system as set forth in claim 7 wherein the terrain data is displayed relative to the altitude of an aircraft.

10. A flight deck display system as set forth in claim 8 wherein the terrain data is displayed relative to the altitude of the aircraft.

11. A flight deck display system as set forth in claim 7 wherein the weather data and the terrain data represented on the display are scaled such that the displays of the data are dimensionally juxtaposed to allow rapid recognition of the data by a user of the display system.

12. A flight deck display system as set forth in claim 11 further comprising superimposing aircraft altitude and path markers on the terrain data such that the marker represents a position a fixed distance ahead of the actual position of the aircraft.

13. A flight deck display system for use in an aircraft comprising:
   a display having a display screen for graphical display of data,
   a graphics processor for receiving terrain data from at least a terrain data base and weather data from a weather sensor and for converting the received data into a single data stream to provide an input data stream to the display screen, the display screen having two display areas, a lateral two-dimensional display area and a three dimensional display area,
   the display displaying the weather data only on the lateral two-dimensional area of the display screen in a lateral display format and displaying the terrain data on at least the three dimensional area of the display screen as an out-the-window view,
   thus contributing to the clarity and ease of interpretation of the display.

14. A fight deck display system as set for in claim 13 wherein the terrain display is represented in colors to show features of the terrain relative to the altitude of the aircraft.

15. A flight deck display system as set forth in claim 13 wherein the weather display is represented in colors to show features of the weather relative to the severity of the weather.

16. A flight deck display system as set forth in claim 13 wherein terrain features are displayed in a color format in which terrain features substantially below the altitude of the aircraft are colored green, terrain features at substantially the altitude of the aircraft are colored yellow, and terrain features at or above the altitude of the aircraft are colored red.

17. A method for simultaneously displaying terrain and weather data on a unitary display screen, comprising;

providing a graphics processor for receiving terrain data from at least a terrain data base and weather data from a weather data source and for converting the received data into a single data stream to provide an input data stream to the display screen, the display screen having two display areas, a lateral two dimensional display area and a three dimensional display area, displaying the weather data only on the lateral two dimensional are of the display screen, thus contributing to the clarity and ease of interpretation of the display, and displaying the terrain data at least on the three dimensional area of the display screen, the weather data being displayed most efficiently solely as a two-dimensional graphic and the terrain data being displayed as a three dimensional graphic.

18. A method as set forth in claim 17 wherein the terrain data is displayed as an out the window display graphic.

19. A method as set forth in claim 17 wherein the terrain data is displayed relative to the altitude of an aircraft.

20. A method as set forth in claim 18 wherein the terrain data is displayed relative to the altitude of an aircraft.

* * * * *

(12) EX PARTE REEXAMINATION CERTIFICATE (8531st)
United States Patent
Dwyer et al.

(10) Number: US 6,653,947 C1
(45) Certificate Issued: Sep. 13, 2011

(54) APPARATUS FOR THE DISPLAY OF WEATHER AND TERRAIN INFORMATION ON A SINGLE DISPLAY

(75) Inventors: David B. Dwyer, Scottsdale, AZ (US); Gang He, Morristown, NJ (US)

(73) Assignee: Honeywell International Inc., Morristown, NJ (US)

Reexamination Request:
No. 90/011,041, Jun. 15, 2010

Reexamination Certificate for:
Patent No.: 6,653,947
Issued: Nov. 25, 2003
Appl. No.: 10/081,601
Filed: Feb. 20, 2002

(51) Int. Cl.
| | |
|---|---|
| *G01C 23/00* | (2006.01) |
| *G01S 7/04* | (2006.01) |
| *G01S 7/22* | (2006.01) |
| *G01S 13/94* | (2006.01) |
| *G01S 13/93* | (2006.01) |
| *G01S 13/87* | (2006.01) |
| *G01S 13/95* | (2006.01) |
| *G01S 13/00* | (2006.01) |

(52) U.S. Cl. .................. 340/970; 340/961; 340/968; 342/26 R; 701/14

(58) Field of Classification Search ................ None
See application file for complete search history.

(56) References Cited

U.S. PATENT DOCUMENTS 5,920,276 A   7/1999   Frederick
6,381,538 B1 * 4/2002 Robinson et al. ............ 701/211
6,922,703 B1 * 7/2005 Snyder et al. ................ 345/633

OTHER PUBLICATIONS

EP Office Action, EP 03716427.4-1236 dated Dec. 14, 2010.
MaxSea HTML User Guide (See, Declaration of Exhibit B of Reexamination Statement)
U.S. Provisional Application to Snyder et al. (U.S. Appl. No. 60/153,900) filed Sep. 14, 1999 (102(e)) and published Mar. 28, 2001 (102(a)), issued as U.S. Patent No. 6,922,703 (See, Exhibit A of Reexamination Statement).

* cited by examiner

*Primary Examiner*—Ovidio Escalante

(57) ABSTRACT

A display system having a display screen for graphical display of data, a graphics processor for receiving data from at least a terrain data base and data from a weather radar and for converting the received data into a single data stream to provide an input data stream to the display screen. The single display displays the weather data on one portion of the display screen and displays the terrain data on a second portion of the display screen. The weather data is displayed as a two-dimensional graphic and the terrain data is displayed as a three-dimensional graphic, thus providing a user with the necessary flight information while keeping processing resources to a reasonable level. The terrain data is displayed as an out the window display graphic, and the weather data and the terrain data displays are scaled such that the displays are dimensionally juxtaposed to allow rapid recognition of the data by a user of the display system.

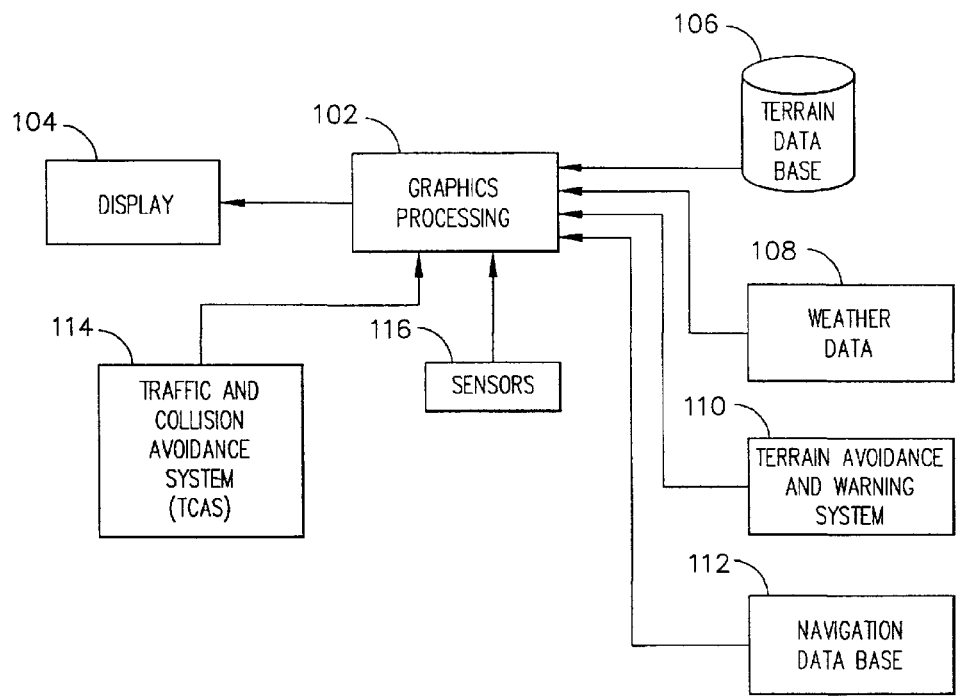

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 5, 6, 13, 15, 17 and 18 are cancelled.

New claims 21-46 are added and determined to be patentable.

Claims 3, 4, 7-12, 14, 16 and 19-20 were not reexamined.

21. *A method for simultaneously displaying terrain and weather data on a unitary display screen, comprising;*
    *providing a graphics processor for receiving terrain data from at least a terrain data base and weather data from a weather data source and for converting the received data into a single data stream to provide an input data stream to the display screen, the display screen having two display areas, a lateral two dimensional display area and a three dimensional display area,*
    *displaying the weather data only on the lateral two dimensional area of the display screen, thus contributing to the clarity and ease of interpretation of the display, and displaying the terrain data at least on the three dimensional area of the display screen,*
    *the weather data being displayed most efficiently solely as a two-dimensional graphic and the terrain data being displaying as a three dimensional graphic providing single point converging perspective.*
22. *A method as set forth in claim 21 wherein the terrain data is displayed as an out the window display graphic.*
23. *A method as set forth in claim 21 wherein the terrain data is displayed relative to the altitude of an aircraft.*
24. *A method as set forth in claim 22 wherein the terrain data is displayed relative to the altitude of an aircraft.*
25. *The method of claim 21, wherein the weather data comprises weather radar data.*
26. *The method of claim 25, wherein a source of the weather radar data is an on-board weather radar unit.*
27. *The method of claim 25, wherein a source of the weather radar data is an external weather data source.*
28. *The method of claim 27, wherein the external weather data source is a ground-based weather data source.*
29. *The method of claim 27, wherein the external weather data source is a satellite weather data source.*
30. *The method of claim 21, wherein the weather data comprises real-time weather data.*
31. *The method of claim 21, wherein displaying the weather data includes automatically rendering updated weather data.*
32. *The method of claim 31, wherein the automatic rendering is based at least in part on position, speed and direction data provided to the graphics processor.*
33. *The method of claim 21, wherein the weather data comprises a storm cell.*
34. *The method of claim 21, wherein the weather data comprises the location of a weather cell containing precipitation.*
35. *The method of claim 34, wherein the precipitation is displayed in a plurality of colors based on the weather content of the weather cell.*
36. *The method of claim 21, wherein the weather data is received from a satellite weather data source.*
37. *The method of claim 21, wherein the graphics processor receives position, speed, and direction data.*
38. *The method of claim 21, wherein the single data stream is provided as a single input to the display screen, the single input comprising the input data stream containing data for the two display areas.*
39. *The method of claim 21, wherein the terrain data displayed on the three dimensional area of the display screen is color coded to represent a distance to the terrain represented by the terrain data.*
40. *The method of claim 21, wherein the two display areas are two areas of a unitary display window.*
41. *The method of claim 21, wherein the two display areas are two windows.*
42. *The method of claim 41, wherein the two windows correspond to user inputs.*
43. *The method of claim 21, wherein the display areas are scaled such that the display areas are dimensionally juxtaposed.*
44. *The method of claim 43, wherein the scaling of the display areas is automatic.*
45. *The method of claim 21, wherein the two display areas have the same scale.*
46. *The method of claim 21 wherein the unitary display screen comprises a flight deck display system for use in an aircraft.*

* * * * *